Jan. 18, 1949.                C. J. BEAVER ET AL                2,459,212
                    JOINTING OF CONDUCTORS OF ELECTRIC CABLES
                               Filed Nov. 29, 1944
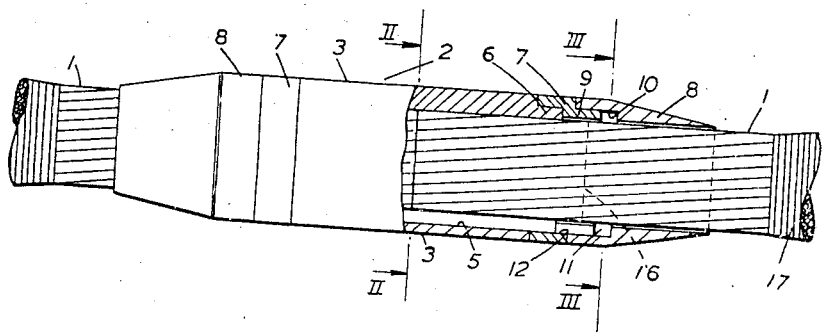
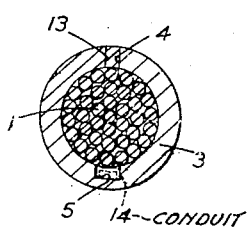
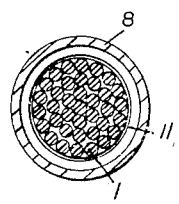
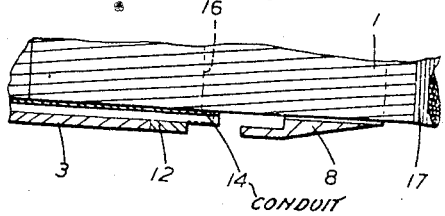
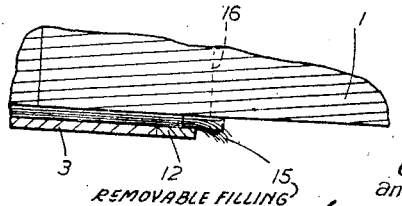
Inventors
Charles James Beaver
and Edward Leslie Davey Patented Jan. 18, 1949

2,459,212

UNITED STATES PATENT OFFICE 2,459,212

JOINTING OF CONDUCTORS OF ELECTRIC CABLES

Charles James Beaver, Bowdon, and Edward Leslie Davey, Timperley, England, assignors to W. T. Glover & Company Limited, Manchester, England, a British company Application November 29, 1944, Serial No. 565,670
In Great Britain January 17, 1944

4 Claims. (Cl. 174—21)

In a convenient and extensively used method of jointing the conductors of electric cables a metal sleeve or ferrule is employed which has a longitudinal slot throughout its length and is adapted to have the slot opened to a sufficient width to permit the sleeve to be placed over the abutting bared ends of the two lengths of conductor to be jointed and then to be closed round them by hand or other pressure exerted through suitable tools. To facilitate the opening out of the ferrule it is weakened by the formation of a longitudinal groove from end to end of its inner face at a position diametrically opposite to that of the slot. After closing the ferrule round the ends of the conductor lengths the jointing is completed by pouring solder through the narrow slot to fill up the interstices between the conductor and the ferrule. The adjacent ends of the two lengths of conductor have previously been tinned so that a solid joint is made within the ferrule.

In joints for use on so-called gas filled cables (an example of which is described in the specification of United States Letters Patent No. 2,067,169) it is advantageous to provide a free gas passage throughout the length of cable formed of jointed conductors. With such a passage, if a gas leak should occur on a cable the pressure of gas in and around the conductor is maintained at a high value throughout its length by feeding gas along the conductor to the leaking part of the cable from the adjacent parts in which a high pressure exists. If the gas pressure is maintained in this region at a high value no ionisation can occur in the dielectric adjacent to the conductor, which is the most vulnerable part of the dielectric as regards breakdown, so that the cable can be kept in service without detriment during the period of the existence of the leak.

The interstices between the wires of the conductor provide a sufficiently free passage for the flow of the gas to feed a leak, but at the joints, as above described, these interstices are obstructed by the filling up of the ends of the lengths of conductor within the ferrule with solder.

In accordance with the invention the joint is so arranged, and the making of the joint so carried out that after the completion of the jointing of two conductor lengths, a longitudinal passage exists between the outer surface of the jointed ends of the conductor and the inner surface of the wall of the ferrule and this passage connects with spaces on each conductor length outside the region where the interstices between wires have been filled. For this purpose we employ a joint ferrule consisting of a central part and of two end caps fitting one on each end of the central part and providing a smooth transition from the external surface of the central part to that of the conductor as described in the specification of British Letters Patents 484,505 The central part is a central sleeve provided with a longitudinal slot throughout its length and in its internal surface, preferably diametrically opposite the slot, a longitudinal groove also extending throughout its length. This groove which is provided for the weakening of the ferrule for ease of bending we use for the longitudinal passage and means are provided to prevent this groove from becoming filled with solder. The end caps provide between their internal walls and the conductor surfaces outside the solder-filled ends of the jointed lengths of conductor annular spaces which are in communication with one another through the longitudinal groove of the central part.

By way of example and in order that the invention may be more fully understood and readily carried out, a preferred form of construction of our improved conductor joint for gas filled cables will now be described with the aid of the accompanying drawings, wherein:

Figure 1 is a view, half in elevation and half in longitudinal section of the completed conductor joint, Figure 2 is a cross-section on the line II—II of Figure 1, Figure 3 is a cross-section on the line III—III of Figure 1, and Figures 4 and 5 are fragmental views of the conductor joint at an intermediate stage of the jointing operation showing alternative means for preventing the ferrule groove from becoming filled with solder.

Referring now to the drawings, it will be seen that the abutting ends of two lengths of stranded conductor 1 are connected by a joint ferrule 2. The ferrule comprises a central part and two end caps. The central part 3 is in the form of a sleeve of which the general cross-sectional shape is circular. This sleeve has a longitudinal slot 4 extending from end to end thereof and in its internal surface diametrically opposite the slot 4 is a longitudinal groove 5 which also extends from end to end of the sleeve. At each end, the external diameter of the central part is reduced to form a spigot 6. Each end cap comprises two parts one of which is in the form of a ring 7 which is a loose fit on the conductor and fits over one of the spigots 6 and the other of which is a hollow tapering body which is also a loose fit on the conductor and of which the larger end is adapted to make a spigot and socket joint with the outer end of the ring 7. Preferably the outer end of the ring is of reduced diameter to form a spigot 9 and the adjacent end of the body 8 is shaped to form a socket 10 for this spigot. The axial length of the socket 10 is greater than that of the spigot 9 so as to provide between the parts 7 and 8 an annular groove 11 which is placed in communication with the groove 5 in the central part 3 by a longitudinal groove 12 in the ring 7 which can be made to register with the groove 5. In this way the interstices in the part of the conductor underlying the one end cap are in communication with those in the part of the conductor underlying the other end cap.

In making the joint the end caps are of course placed on the conductor lengths before bringing the ends thereof into alignment and placing the central part of the ferrule laterally on the ends and closing it upon them. Where the end caps are made in two parts, as shown in the drawings, the inner parts or rings are slid forward over the reduced ends of the central part of the ferrule so as to hold it in a closed position. The conductor lengths are then secured in the central part of the ferrule by soldering. To prevent the closing up of the longitudinal groove in the ferrule during the soldering process, this groove is provided with a filling which prevents the entry of the solder. This filling may be a permanent part of the joint as shown in Figure 4, or may be a filling 15, as shown in Figure 5, that is removed after the soldering. In the former case the filling is a conduit 14 in the form of a tube or an inverted trough with open ends, which is preferably of such a length that it projects beyond the ends of the ferrule and the rings 7, if used, into the spaces within the end caps. As the removable filling 15 there may be used a bunch of wires, or a strand of metal or a strip or strand of suitable non-metallic material which by its nature or the treatment of its surface is not wetted by the solder so that it is not held thereby and after the completion of the soldering operation may be drawn out. Steel or other high tensile metal wires may be used. It is preferable that, before the filling of the ferrule with solder 13, the surfaces of the conductor immediately adjacent to the central part of the ferrule, say from the point 16 to the adjacent edge of the cut-back dielectric 17, should be treated with plumbers' black, or other suitable coating, to prevent the solder from spreading into the conductor beyond the end of the central part of the ferrule.

After the soldered joint is made, the end caps or the outer parts thereof as the case may be, are slid into position over the central part of the ferrule or the rings respectively. It is not necessary to solder them in this position. They can be held there by means of a lapping of so-called conducting tape which provides a continuous covering from one conductor over each end cap and ferrule to the other conductor.

In the way described, a conductor joint is produced which has all the advantages of fulfilling the electrical requirements in the usual way and has the additional advantage of providing a free gas passage across the joint without increasing its overall dimensions or changing the external form of the joint which is smoothly continuous from tapered end to tapered end.

What we claim as our invention is:

1. A soldered ferrule joint between two lengths of gas filled cable conductor, comprising a longitudinally split metal sleeve having a longitudinal groove in its internal surface extending from end to end of the sleeve, a spigot portion on each end of said sleeve, a pair of metal rings each forming an inner part of an end cap for said sleeve and fitting on one of said spigot portions and having its external surface flush with the external surface of said sleeve and a through longitudinal face in its internal surface registering with the groove in its internal surface registering with the adjacent end of the groove in the sleeve, a second pair of rings, each forming an outer part of one of said end caps and making with the free end of the adjacent inner part of the cap a spigot and socket joint of which the socket is of greater axial length than the spigot to provide between the fitted rings an annular groove and each having an external surface providing a smooth transition from the external surface of the inner part fitted on the said sleeve to that of the conductor, and solder filling the interstices within the said sleeve and within the adjacent ends of the inner parts of the end caps other than the registering longitudinal grooves therein, the annular grooves between the inner and outer parts of the end caps being clear and in communication with said registering grooves and with the interstices within the parts of the conductor surrounded by the outer parts of said end caps.

2. A method of making a soldered conductor joint between two successive lengths of gas filled electric cable with the aid of a ferrule consisting of a longitudinally split sleeve weakened by a longitudinal groove in its inner surface extending from end to end of the sleeve and of a pair of end caps, each consisting of two separable parts, an inner and an outer, the former having a through longitudinal groove in its internal surface and making a spigot and socket joint with the latter, said end caps being adapted to slide on the stranded conductor and to fit on the ends of the sleeve and provide a smooth transition from the external surface of the sleeve to that of the conductor, said method comprising placing an end cap on each end of the conductor and applying said sleeve laterally to the ends of the conductor and closing said sleeve thereupon, sliding each inner part of each end cap on the adjacent end of the sleeve so that the groove in the inner part registers with the groove in the sleeve, securing the ends of the conductor in said sleeve and the inner parts of said end caps whilst preventing the closing up of said registering grooves by solder by a temporary filling for said grooves, allowing the solder to solidify and withdrawing said filling and sliding said outer parts of said end caps towards said inner parts to make spigot and socket joints therewith.

3. A method of making a soldered conductor joint between two successive lengths of gas filled electric cable with the aid of a ferrule consisting of a longitudinally split sleeve weakened by a longitudinal groove in its inner surface extending from end to end of the sleeve and of a pair of end caps, each consisting of two separable parts, an inner and an outer, the former having a through longitudinal groove in its internal surface and making a spigot and socket joint with the latter, said end caps being adapted to slide on the stranded conductor and to fit on the ends of the sleeve and provide a smooth transition from the external surface of the sleeve to that of the conductor, said method comprising placing an end cap on each end of the conductor and applying said sleeve laterally to the ends of the conductor and closing said sleeve thereupon, sliding each inner part of each end cap on the adjacent end of the sleeve so that the groove in the inner part registered with the groove in the sleeve, securing the ends of the conductor in said sleeve and the inner parts of said end caps whilst preventing the closing up of said registering grooves by solder, allowing the solder to solidify and sliding said outer parts of said end caps towards said inner parts to make spigot and socket joints therewith.

4. A method of making a soldered conductor joint between two successive lengths of gas filled electric cable with the aid of a ferrule consisting of a longitudinally split sleeve weakened by a longitudinal groove in its inner surface extending from end to end of the sleeve and of a pair of end caps, each consisting of two separable parts, an inner and an outer, the former having a through longitudinal groove in its internal surface and making a spigot and socket joint with the latter, said end caps being adapted to slide on the stranded conductor and to fit on the ends of the sleeve and provide a smooth transition from the external surface of the sleeve to that of the conductor, said method comprising placing an end cap on each end of the conductor and applying said sleeve laterally to the ends of the conductor and closing said sleeve thereupon, sliding each inner part of each end cap on the adjacent end of the sleeve so that the groove in the inner part registers with the groove in the sleeve, securing the ends of the conductor in said sleeve and the inner parts of said end caps by solder whilst preventing the closing up of said registering grooves by solder by a conduit inserted in said grooves and extending from the outer end of the inner part of one end cap to the outer end of the inner part of the other end cap, allowing the solder to solidify and sliding said outer parts of said end caps towards said inner parts to make spigot and socket joints therewith.

CHARLES JAMES BEAVER.
EDWARD LESLIE DAVEY.

REFERENCES CITED

The following references are of record in the file of this patent:

UNITED STATES PATENTS

| Number | Name | Date |
| --- | --- | --- |
| 1,473,670 | Crosthwait, Sr. | Nov. 13, 1923 |
| 1,647,563 | Emanueli | Nov. 1, 1927 |
| 1,990,077 | Kershaw | Feb. 5, 1935 |
| 2,210,804 | Eby | Aug. 6, 1940 |
| 2,277,177 | Wermine | Mar. 24, 1942 |
| 2,362,505 | Smith | Nov. 14, 1944 |
| 2,406,676 | Gambitta | Aug. 27, 1946 |

FOREIGN PATENTS

| Number | Country | Date |
| --- | --- | --- |
| 484,505 | Great Britain | May 6, 1938 |